United States Patent [19]

Stanley

[11] Patent Number: 4,534,084
[45] Date of Patent: Aug. 13, 1985

[54] MEAT STUFFING APPARATUS
[75] Inventor: Thomas R. Stanley, Downers Grove, Ill.
[73] Assignee: Teepak, Inc., Oak Brook, Ill.
[21] Appl. No.: 458,113
[22] Filed: Jan. 14, 1983
[51] Int. Cl.³ .............................................. A22C 11/06
[52] U.S. Cl. ......................................... 17/39; 53/576; 53/567
[58] Field of Search .................... 17/38, 39, 35, 33, 49; 53/51, 389, 567, 536, 576

[56] References Cited
U.S. PATENT DOCUMENTS

| | | | |
|---|---|---|---|
| 133,342 | 11/1872 | Silver | 17/38 |
| 2,955,398 | 11/1960 | Dreeben | 53/551 |
| 3,919,739 | 11/1975 | Kawai | 17/49 X |
| 4,419,854 | 12/1983 | Okada et al. | 53/567 X |

Primary Examiner—Willie G. Abercrombie
Attorney, Agent, or Firm—Michael L. Dunn; William J. Crossetta

[57] ABSTRACT

An improved apparatus and arrangement is disclosed which is adopted for the automatic encasement of chunk, sectioned and formed meat products. More particularly, the improved apparatus and arrangement of the instant invention provides for automatically stuffing chunk, sectioned and formed meat products into continuous stock tubular casing.

22 Claims, 5 Drawing Figures

MEAT STUFFING APPARATUS

BACKGROUND OF THE INVENTION

The stuffing of chunk, sectioned and formed meat products into casing has been a continuing commercial problem to the meat packing industry. As distinct from the very sophisticated automated machinery typically utilized in the high speed stuffing of ground and emulsified meats for sausages, etc., the machinery utilized in stuffing chunk, sectioned and formed meat products has been slower and more cumbersome to operate.

Conventionally, the stuffing of meat which had not been ground or otherwise emulsified had been manually performed. Typically, tubular casings were cut into short predetermined lengths and the individual casings were fitted to extrusion filling nozzles where the meat was extruded therein. Upon filling, the casing was shaped and the ends were tied to form the stuffed meat product. As is apparent, significant quantities of casing was wasted, the extrusion was messy and the entire process was labor intensive.

In the last seveal years, several apparatus have been proposed for the more efficient stuffing of chunk, sectioned and formed meats. Each of the apparatus automates steps in the aforesaid conventional method of meat stuffing but with significant reductions in labor intensity and increases in efficiency. Though the sophistication of the art has been significantly enhanced, problems still exist in the waste of casing material and speed of manufacturer.

Accordingly, it is an object of the present invention to provide an arrangement and stuffing apparatus which avoids the shortcomings and drawbacks encountered in the prior art.

Another object of the present invention resides in an improved arrangement and apparatus for stuffing meat, not in the ground or emulsified state, into casings which have been adapted for the automatic production of stuffed meat products.

A further object of the present invention resides in providing an arrangement and apparatus for stuffing meat which requires minimum manual labor.

Another further object of the present invention is to provide an improved arrangement and apparatus for stuffing chunk, sectioned and formed meat with reduced casing waste.

DISCLOSURE OF THE INVENTION

According to the present invention, continuous band tubular casing is passed through a multi-functional casing feed, lock and adjustment means to a carrier means which intermittently draws the forward opened end of the casing to engage a filling nozzle of a meat extruding means. The extruder filling nozzle in turn engages a meat stuffing hopper, which receives and holds chunks, sections and formed meat for stuffing. In one embodiment of the invention, a stuffing piston forces the meat in the hopper through the filling nozzle into the casing. The casing is filled and the carrier returns to its starting position awaiting the start of a new cycle. After the casing is filled with meat and shaped, it is automatically bound and cut away from the continuous casing supply.

The features and advantages of the present invention will be more particularly described by way of examples, with references to the accompanying drawings in which.

Figure 1:
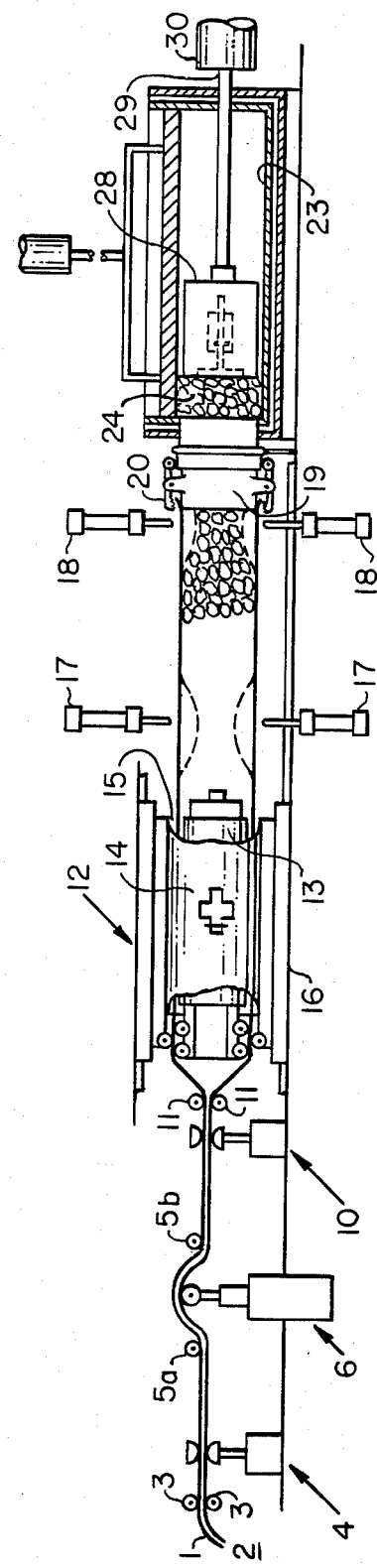
FIG. 1, is an illustration of the process and apparatus arrangement according to the present invention.

Referring now to the drawings, wherein like reference numerals are used throughout the various views to designate like numerals and more particular to FIG. 1, which illustrates the sequence of the meat stuffing process through the major operating elements of the apparatus. Therein, flattened tubular casing (1) from a continuous supply means (2) is guided by guiding means (3) into the casing feed, lock and adjustment apparatus. The casing feed, lock and adjustment apparatus comprises first casing lock means (4), guiding means (5a) and (5b), and positioned therebetween in a spaced apart relationship, intermittently displaceable uptake/adjusting means (6) and second casing lock means (10).

The casing feed, lock and adjustment apparatus acts to intermittently strip determinable quantities of casing from the supply means for supply to the carrier and to adjust the stuffed casing. The casing passes from the feed, lock and adjustment apparatus through guiding means (11) to carrier means (12).

Carrier means (12) shuttles from the area of guiding means (11) engaging filling nozzle (19) of meat supply hopper (23) and back, causing the terminal end of the flattened casing to be opened and drawn to the nozzle for filling. A preferred carrier means typically consists of an inner cylinder (13) and an outer cylinder (14) with a gap (15) interposed therebetween. The carrier is supported by base (16) and typically is guided by a rail guiding means throughout the course of its path. The outer cylinder (14) typically includes projections for engagement with such guiding rail(s). The carrier means can be belt, chain, gear, pneumatic, magnetic or otherwise driven by engaging the outer cylinder (14). The casing is passed over the inner cylinder (13) of the carrier and occupies the gap between the inner cylinder (13) and outer cylinder (14). Typically, the inner cylinder and outer cylinder contain interlocking rollers and a casing brake mechanism(s) which allows continuous, one-way passage of the casing through the carrier while maintaining the outer and inner cylinders in continuous integral relationship.

In a preferred embodiment, the carrier (12) draws the forward open end of the casing up to and extends it over the peripheral surface of filling nozzle (19) where it is secured by securing device (20). Chunk, sectioned and formed meat (24) contained in meat supply hopper (23) is compressed by ram (28), by means of piston rod (29) controlled by pneumatic cylinder (30), through extruding nozzle (19) into the casing. The casing is filled; carrier (12) moves back towards its starting position proximate guiding means (11); compression and binding means (18) engages; compression, binding and cutting means (17) engages coincidentally with adjustment means (6) to compress, gather, adjust, bind and automatically cut the meat filled segment of casing from the continuous casing supply.

Figure 2:
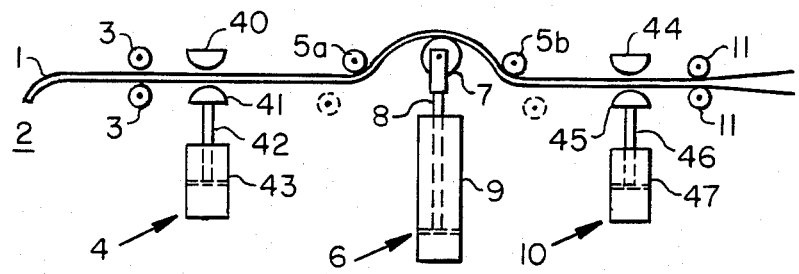
FIG. 2, is a partial sectional view of a multi-functional casing feed, lock and adjustment apparatus according to the present invention.

FIG. 2, is a partial sectional view of an improved multi-functional casing feed, lock and adjustment apparatus in accord with the present invention. Therein, premoistened, flattened tubular casing is passed through guide rollers (3) to a first casing lock (4). Casing lock (4) is comprised of a stationary bar (40) which is engaged by a locking bar (41) which is secured to the piston rod (42) of a pneumatic cylinder (43) such that when the piston rod (42) of the pneumatic cylinder (43) is extended, locking bar (41) will press the casing (1) against the stationary bar (40) preventing further movement thereof. The casing is then passed under guide roller (5a) over uptake/adjustment roller (7) and under guide roller (5b). Guide rollers (5a) and (5b) are maintained in a fixed position relative to each other during operation of the apparatus, but uptake/adjustment roller (7) is rotatably secured through the piston rod (8) of the pneumatic cylinder (9) such that when the piston rod (8) of the pneumatic cylinder (9) is extended, the distance traveled by the casing between guide roller (5a) and (5b) is increased.

It should be noted, that the improved apparatus of the invention includes multiple guide means engaging the flat surface of the casing on the top or bottom sides thereof. Such guide means may be permanently or adjustably mounted so as to increase or decrease the distance therebetween and may be so arranged to guide and/or transport the casing at any angle. Similarly, the uptake/adjustment may be mounted at any angle, providing that it remains deposed between at least two guide means and acts to intermittently increase and decrease the distance traveled by the casing between said guide means.

The casing then passes from guide roller(s) (5b) to the second casing lock (10). Casing lock (10) is comprised of stationary bar (44) which is engaged by locking bar (45) which is secured by the piston rod (46) of pneumatic cylinder (47) such that when the piston rod (46) of the pneumatic cylinder (47) is extended, locking bar (45) will press the casing (1) against stationary bar (44) preventing further movement thereof.

Considering FIGS. 1 and 2, in the normal operation of the casing feed, lock and adjustment apparatus pneumatic cylinder (47) of the second casing lock (10) is engaged with locking bar (45) pressing the casing against the stationary bar (44) and preventing it from movement therethrough. Pneumatic cylinder (9) is activated extending uptake/adjustment roller (7) and in turn drawing casing (1) through guide feed roller (5a) at the first casing lock (4). The extension distance of the uptake/adjustment rollers is such that the amount of casing drawn into the apparatus is sufficient so that carrier (12) can bring the terminal end from its rest position near guide rollers (11) to engage filling nozzle (19). As the uptake/adjustment roller reaches a determinable uptake extension, pneumatic cylinder (43) of the first casing lock (4) is activated and locking bar (41) presses the casing against stationary bar (40) preventing further movement therethrough. Pneumatic cylinder (47) of the second casing lock is deactivated and the casing movement therethrough is no longer inhibited. Carrier (2) traverses the distance from its resting position at guides (11) to engage filling nozzle (19) and pneumatic cylinder (9) disengages and returns to its normal position. After the casing is stuffed, uptake/adjustment roller (7) is again activated to extend a determinable adjustment distance. This activity is termed the adjustment function and acts to adjust the casing on the stuffed meat. At the completion of the adjustment function, casing lock (4) disengages and the apparatus is ready for the initiation of a new cycle.

Figure 3:
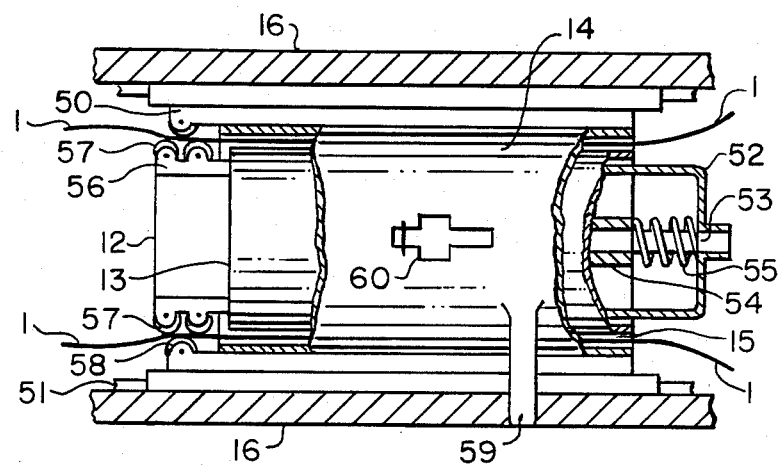
FIG. 3, is a partial sectional view of a typical prior art carrier apparatus.

Multiple varied carrier means may be employed in the arrangement of this invention. FIG. 3, is a partial sectional view of a typical prior art carrier apparatus as disclosed in U.S. Pat. No. 3,919,739. Therein, outer cylinder (14) includes axial elongated projections (50) on its top and bottom surfaces, which projections are engaged in guide rails (51) extending from the area of the filling nozzle (19) through the traveling path of the carrier. The inner cylinder (13) includes a head (52) secured to a spindle (53) passed through a sleeve (54) therein. The member (52) is normally biased to a projected position beyond the end of the inner cylinder (13) by means of a spring (55) housed in the inner cylinder (13). In the rear end of the inner cylinder (13), there is provided a bracket (56) on which, adjacent to the upper and lower edges thereof, a pair of rollers (57) are carried. The pair of rollers (57) are engaged by their mating rollers (58) carried on the elongated projections (50), such that axial displacement of the inner and outer cylinders (13) and (14) is prevented thereby insuring the unitary movement of the two cylinders. Outer cylinder (14) contains therein further projection(s) (59) engaging the driving mechanism (in this instance a pneumatic piston) and casing brake mechanism (60).

Considering now FIG. 1, together with FIG. 3, the casing (1) is opened from the flattened state upon exiting guiding means (11) and its terminal end passes through rollers (57) and (58) as it is extended to cover up inner cylinder (13), interposed in gap (15) between cylinders (13) and (14). Braking mechanism (60) is adopted to allow the casing to pass in only one direction, e.g. toward filling nozzle (19). The uptake/adjustment roller (7) contracts from it's uptake extension, the second casing lock (10) disengages and the carrier (12) traverses the guiding rails to the extruding nozzle (19) drawing the casing therewith. Inner cylinder (13) of carrier (12) engages the extruding nozzle (19), head (52) thereof compressing on shaft (53) in such manner as to cause the open terminal end of the casing to be extended over the peripheral surface of the filling nozzle. The terminal end of the continuous casing may be secured by various means to the extruding nozzle, including clamping means, ring means, etc.

Figure 4:
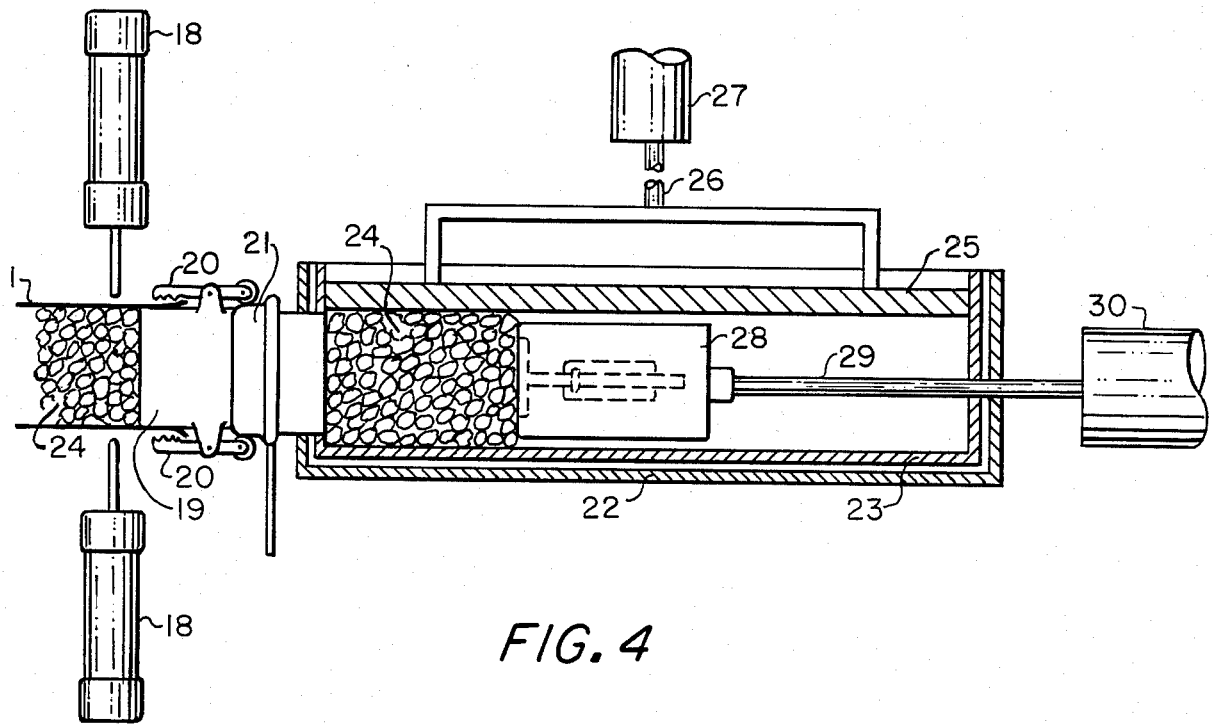
FIG. 4, is a partial sectional view of a hopper and meat stuffing apparatus in accord with this invention.

Multiple varied extruding means may be employed in the arrangement of this invention. FIG. 4 is a partial sectional view of a stuffing meat hopper and extruding apparatus in accord with this invention. Therein, casing (1) is shown extended over the peripheral surface of nozzle (19), as caused by the action of carrier (12), and secured by pivoting securing device(s) (20) through the action of slidably fitted can ring (21). Filling nozzle (19) and meat hopper (23) are shown, each removably mounted to base apparatus (22) and interconnected to allow a forced flow of stuffing meat (24) from hopper (23) through nozzle (19). Meat hopper lid (25), secured by piston rod (26) of pneumatic cylinder (37), is shown fitted to engage the filling opening of meat hopper (23). Piston ram (28), secured by piston rod (29) through pneumatic cylinder (30), is fitted such that it extends through the internal area of the meat hopper in the direction of flow of stuffing meat (24) through extruding nozzle (19). Automatic binding and cutting device (18) acts to wring up the open protruded end portion of the casing, automatically bind it with a substantially U-shaped clip and cut the casing if appropriate.

In the ordinary operation of the stuffing meat hopper and extruding apparatus, pneumatic cylinder (27) is activated to contract piston rod (26) which in turn lifts meat hopper lid (25) from the filling opening of meat hopper (23). Similarly, pneumatic cylinder (30) is activated to contract piston rod (29) which in turn displaces piston ram (28) away from filling nozzle (19) providing meat loading space in hopper (23). The thus empty hopper (23) is loaded with the appropriate chunks, sections and formed stuffing meat and pneumatic cylinder (27) is activated to extend piston rod (26) which in turn causes meat hopper lid (25) to engage the filling opening of hopper (23). Hopper lid (25), when fully engaged in the filling opening in hopper (23), forms the final wall of a tubular meat ramming area within the meat hopper, with the exterior surface of piston ram (28) configured to conform therewith. When hopper lid (25) engages the filling opening of hopper (23), pneumatic cylinder (30) is activated to expand piston rod (29), which in turn forces piston ram (28) toward filling nozzle (19). Stuffing meat (24), which is contained in the tubular meat ramming area is compressed and forced, toward and through nozzle (19) into the casing (1). As the casing is filled to the desired capacity, pneumatic cylinder (30) is deactivated, thereby halting the ramming action of piston ram (28) and accordingly the flow of stuffing meat through the filling nozzle. Automatic binding device (18) is then activated to wring up the open terminal end portion of the filled casing with a substantially U-shaped clip.

Considering now again FIGS. 1 and 2 wherein carrier (12) has returned to its resting position proximate casing guide (11), casing (1) is filled with stuffing meat and automatic binding devices (17) and (18) have been activated. First locking means (4), is activated, so that locking bar (41) presses casing (1) against stationary bar (40) preventing further movement of the casing therethrough and pneumatic cylinder (9) is activated extending uptake/adjustment roller (7) to a determinable increment of its full extension. As the uptake/adjustment roller extends, casing is drawn or stretched theretowards through the point of compression at automatic binding device (17). This activity is termed the adjustment extension of roller (7) and acts to pull the casing tightly over the meat stuffed therein, thereby further forming the packaged product and eliminating unnecessary wrinkles, entrapped air, etc., in the casing. The automatic binding and cutting devices (17) and (18) act to compress, bind and cut the stuffed casing away from the continuous casing supply. It should be understood that though the incremental extension of the uptake/adjustment roller can be predetermined, the instant invention also includes control of the roller extension through sensory means including pressure resistance sensing means.

When the operation of the automatic binding devices is finished, the completed stuffed casing product is transferred by a suitable means (not shown) from the apparatus for the start of a new stuffing cycle.

Figure 5:
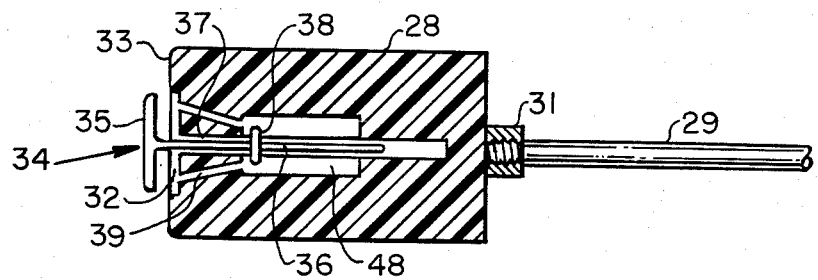
FIG. 5, is a partial sectional view of a stuffing piston according to the present invention.

FIG. 5, is a partial sectional perspective view of a piston ram means (28) in accord with the present invention. Therein, piston ram (28) is secured to piston rod (29) through securing device (31). The shape of the ramming body of piston ram (28) is configured to the approximate shape of the stuffing meat ramming area of meat hopper (23) when hopper lid (25) is engaged to allow essentially unimpeded traverse thereof from its resting position at the far end of the hopper to its maximum extended position which can include extension through filling nozzle (19) into the casing. Piston ram (28) includes a relief valve (23) comprising a head (35) on spindle (36) which is passed through a shaft (37) in said piston ram (28) and is secured thereon by a locking means (38). The ramming surface (33) of piston ram (28) can contain depression (32) configured to accept head (35) of the relief valve. Relief port(s) (39) extend from the area of depression (32) under the relief valve head (35) to piston head vacuum release void (48).

In the ordinary operation of the piston ram, as the ram is being extended, stuffing meat is compresed on the ramming face (33) causing relief valve (34) to close and fitting relief valve head (35) to depression (32). As piston rod (29) is contracted and piston ram (28) is moved away from the compressed meat, a vacuum seal is typically created between the stuffing meat and the piston ram face (33) which tends to draw the stuffing meat back in the direction of the ram and out of the casing. Upon the formation of such vacuum seal, relief valve (34) opens, by spindle (36) sliding through shaft (37) until it is restricted by locking means (38). On opening, air is drawn through relief port(s) (39) from piston head vacuum relief void (48) and causes the vacuum seal to be broken.

Thus, as is evident from the foregoing, according to the present invention, casings can be supplied in the form of a continuous band from a reel, and meat can be automatically stuffed in these casings one after another, thus eliminating the necessity of manual work, such as cutting short casings. Also, the difficulty in stuffing meat into casings under the manual method has been solved, allowing a great advantage in this invention to be that of labor required for producing stuffed foods.

While I have shown and described various elements in accord with the present invention, it is understood that the same is not limited to but is susceptible to numerous changes and modifications as known to those skilled in the art. Consequently, I do not wish to be limited to the details shown and described here and do intend to cover all such changes and modifications as are encompassed by the scope of the appended claims.

What is claimed is:

1. An arrangement for the automatic production of stuffed meats from a continuous band tubular casing comprising:

a meat extruder, having a filling nozzle means;

a carrier means for selectively carrying at least a portion of a continuous band tubular casing from a casing uptake and adjustment means to said filling nozzle means and comprising means for engaging the forward open end of said tubular casing with said filling nozzle means; and a continuous band tubular casing uptake, lock and adjustment means comprising at least two casing lock means for intermittently engaging and preventing through movement of said casing, a casing uptake and adjustment means for intermittently drawing measured amounts of casing from a casing supply means and intermittently tensioning casing which has been fed to said carrier means, said casing uptake and adjustment means disposed between said lock means comprising an intermittently displaceable casing guide means and, control means for sequentially, intermittently engaging said casing lock means and displaceable casing guide means in casing uptake and tensioning function.

2. An arrangement according to claim 1 wherein said displaceable casing guide means is a roller means.

3. An arrangement according to claim 1 comprising at least one fixed casing guide means disposed between one of said lock means and said uptake and adjustment means.

4. An arrangement according to claim 3 wherein said fixed casing guide means is adjustably mounted.

5. An arrangement according to claim 1 wherein said displaceable casing guide means is displaced by pneumatic means.

6. An arrangement according to claim 1 wherein said casing lock means is engaged by pneumatic means.

7. An arrangement according to claim 1 wherein means are provided on said carrier means for selectively maintaining said casing thereon as said carrier means is advancing toward said filling nozzle means.

8. An arrangement according to claim 1 wherein a guiding frame means is provided extending substantially from said casing feed, lock and adjusting means to said filling nozzle means, and wherein means are provided for mounting said carrier means on said guiding frame means.

9. An arrangement according to claim 8, comprising means for automatically closing and cutting the continuous band tubular casing including a first and second element disposed above and below said guiding frame means, said means being spaced along said guiding frame means at a distance corresponding substantially to the length of the cased stuffed meat.

10. An arrangement according to claim 1 wherein said carrier means is pneumatically driven.

11. An arrangement according to claim 1 wherein at least one of said casing lock means comprises a pneumatic driven locking bar compressing said casing against a stationary bar.

12. An arrangement in accord with claim 1 wherein meat is extruded from a meat stuffing hopper through said filling nozzle by ramming means, said ramming means having disposed on the ramming surface thereof, at least one port extending through the ramming means to another surface thereof which is not in continuous contact with meat contained in the stuffing hopper.

13. The arrangement of claim 12 wherein a valve is provided that comprises a head which extends over the port opening in the ramming surface and is secured to a spindle which is slidably attached to said ramming means.

14. The arrangement of claim 13 wherein the ramming surface of said ramming means contains a depression, configured to accept the head of said valve.

15. An apparatus for the automatic production of stuffed meats from a continuous band tubular casing comprising:
a continuous band tubular casing uptake, lock and adjustment means comprising at least two casing lock means for intermittently engaging and preventing through movement of said casing, a casing uptake and adjustment means for intermittently drawing measured amounts of casing from a casing supply means and intermittently tensioning casing which has been fed to a carrier means, said casing uptake and adjustment means disposed between said lock means comprising an intermittently displaceable casing guide means disposed between fixed casing guide means and control means for sequentially, intermittently engaging said casing lock means and displaceable casing guide means in casing uptake and tension function;
a carrier, having means for selectively carrying at least a portion of continuous band tubular casing from said casing feed, lock and adjustment means to a filling nozzle of a meat extruding means and comprising means for engaging the forward open end of said tubular casing with said filling nozzle means; and
a meat extruding means comprising a meat extruder filling nozzle engaging a meat stuffing hopper, said hopper containing means therein for forcing chunk, sectioned and formed meat from said hopper through said meat extruder filling nozzle.

16. The apparatus of claim 15 wherein said means for forcing chunk, sectioned and formed meat from said hopper is a ramming means.

17. The apparatus of claim 16 wherein said ramming means has disposed on the ramming surface thereof, at least one valved port extending through said ramming means to another surface thereof which is not in continuous contact with meat contained in said stuffing hopper.

18. The arrangement of claim 17 wherein a valve is provided that comprises a head which extends over the port opening in the ramming surface and is secured to a spindle which is slidably attached to said ramming means.

19. The arrangement of claim 18 wherein the ramming surface of said ramming means contains a depression, configured to accept the head of said valve.

20. The apparatus of claim 16 wherein said ramming means comprises a ramming piston which is pneumatically driven.

21. The apparatus of claim 15 wherein a pneumatically driven meat hopper lid engages the filling opening of said meat stuffing hopper and acts to compress meat contained in said hopper to a predetermined area of the hopper.

22. The apparatus of claim 16 wherein a pneumatically driven meat hopper lid engages the filling opening of said meat stuffing hopper and acts to compress meat contained in said hopper to a predetermined area of the hopper.

* * * * *